UNITED STATES PATENT OFFICE.

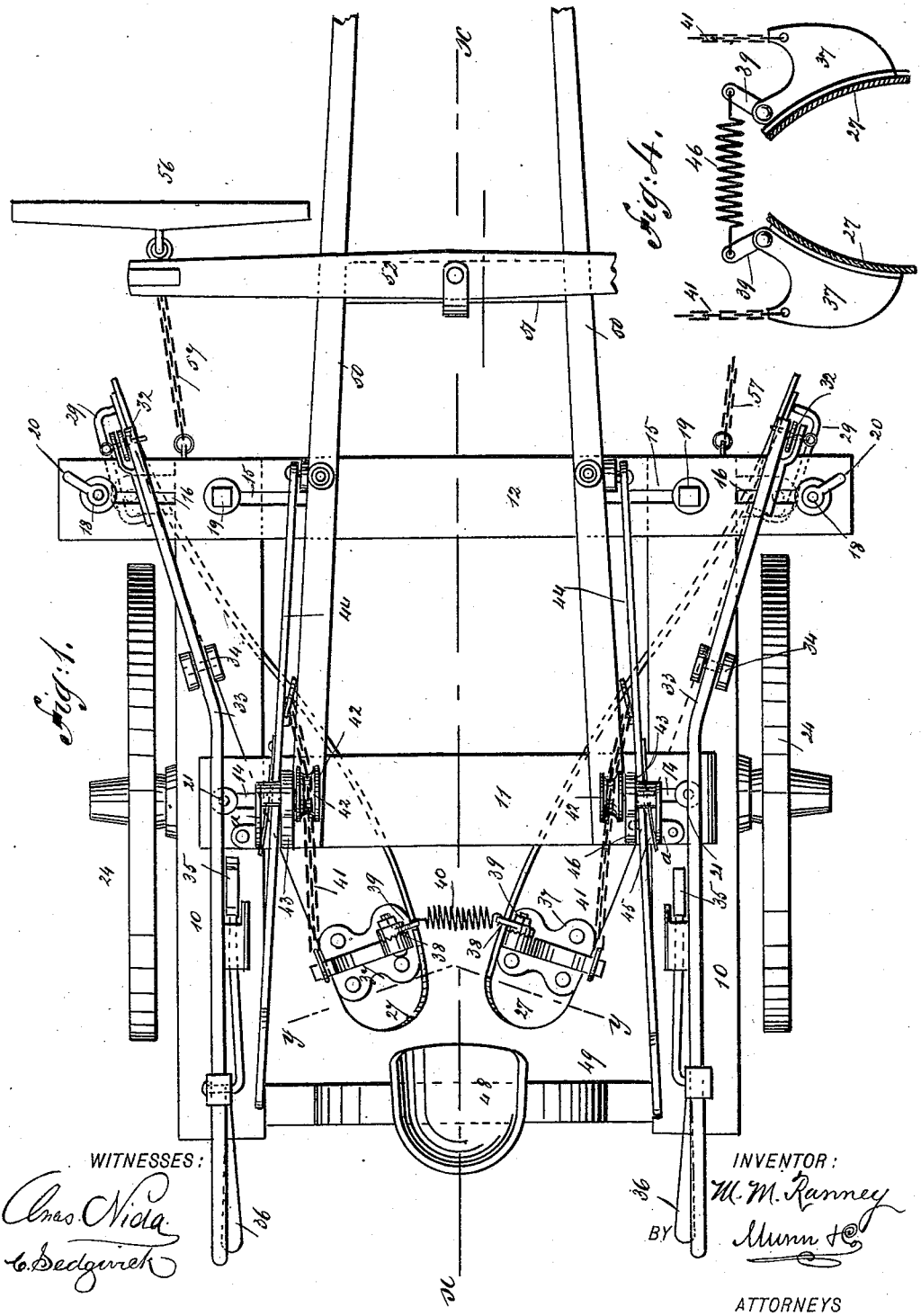

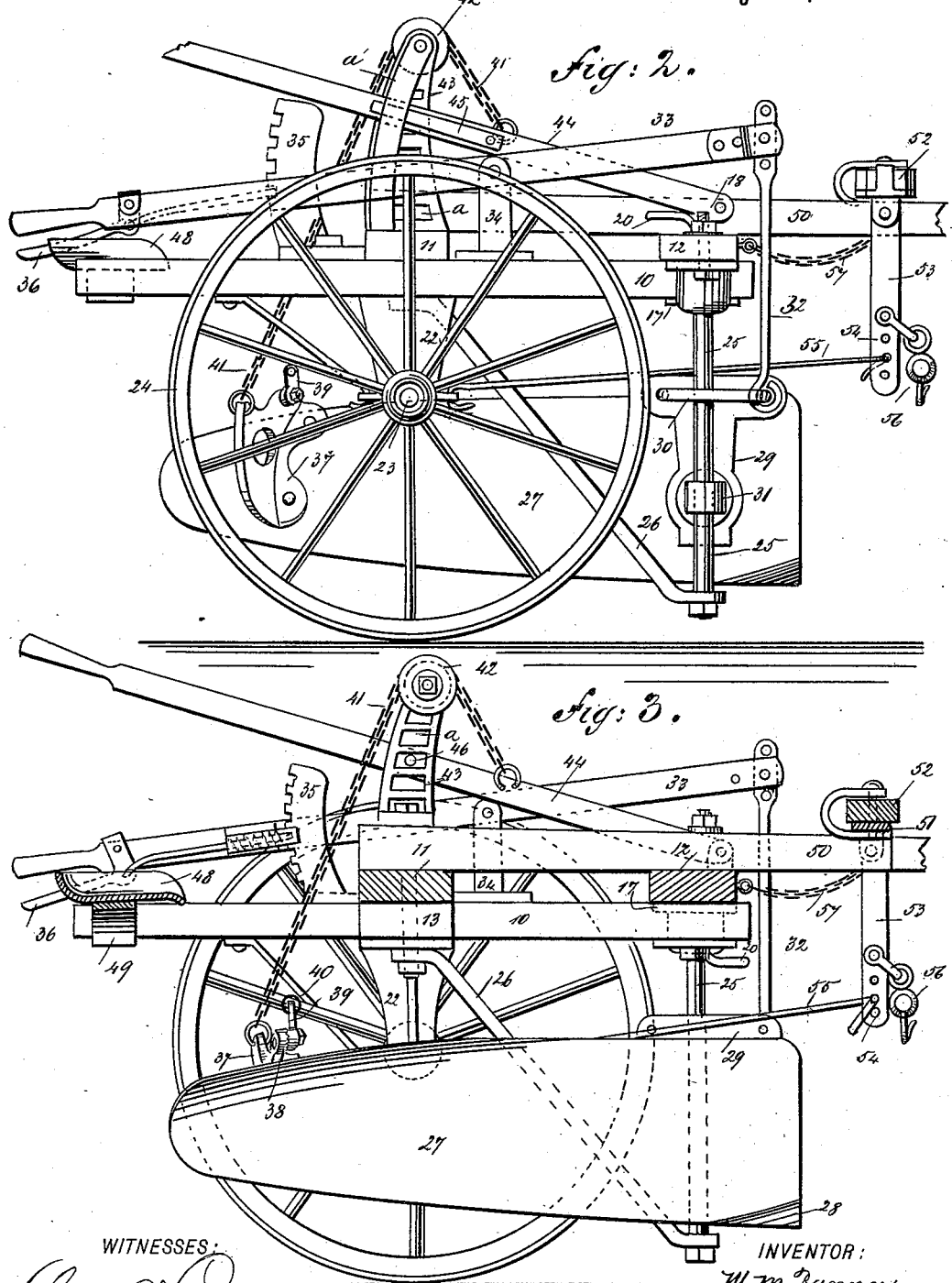

MAURICE M. RANNEY, OF COMSTOCK, MICHIGAN.

MACHINE FOR HILLING CELERY.

SPECIFICATION forming part of Letters Patent No. 428,352, dated May 20, 1890.

Application filed February 8, 1890. Serial No. 339,745. (No model.)

*To all whom it may concern:*

Be it known that I, MAURICE M. RANNEY, of Comstock, in the county of Kalamazoo and State of Michigan, have invented a new and Improved Machine for Hilling Celery, of which the following is a full, clear, and exact description.

My invention relates to an improved machine for hilling celery and other crops where ridging is required, and has for its object to provide a machine of simple and durable construction capable of crowding the earth from the bottom of the furrows under the leaves simultaneously upon both sides of the rows, thus effectually maintaining the plants in an upright position; and a further object of the invention is to provide a machine in which the mold-boards may be adjusted to suit the height of the plants and laterally also to correspond with the width of the rows.

The invention consists in the novel construction and combination of the several parts, as will be hereinafter fully set forth, and pointed out in the claims.

Reference is to be had to the accompanying drawings, forming a part of this specification, in which similar letters and figures of reference indicate corresponding parts in all the views.

Figure 1 is a plan view of the machine. Fig. 2 is a side elevation thereof. Fig. 3 is a central vertical section on line $x$ $x$ of Fig. 1; and Fig. 4 is a transverse section through the mold-boards, taken on the line $y$ $y$ of Fig. 1.

The frame of the machine consists of two parallel side beams 10, a central cross-beam 11, and a forward cross-beam 12. The side beams 10 are adjustable upon the cross-beams 11 and 12 in a manner hereinafter described, and each side beam is provided with an inner arm 13, which extends beneath and in contact with the central cross-beam 11. The central cross-beam 11 at each end is provided with a longitudinal slot 14, and the forward cross-beam 12, which extends beyond the side beams, is provided at each end with two longitudinal slots 15 and 16. A bracket 17 is secured to the under surface of each of the side beams 10 near their forward ends, which brackets extend upward in contact with the outer faces of the said side beams 10 to an engagement with the under side of the projected portions of the forward cross-beam 12.

The adjustment of the side beams is accomplished by means of bolts 18 and 19, passed downward through the slots 15 and 16, and also through the beams 10 and brackets 17, each of said bolts being provided with a thumb-nut 20, the thumb-nut of one bolt being preferably located at the upper end and the nut of the other at the lower extremity. Similar bolts 21 are passed downward through the slots 14 of the central cross-beam 11, and also through the side beams 10. By loosening the nuts upon the bolts 18, 19, and 21 the side beams 10 may be carried inward in the direction of the center of the implement or outward, as the width of the row to be cultivated may demand.

From the under side of each side beam 10, preferably at the center, a pedestal 22 is downwardly projected, each of said pedestals being provided with an attached spud-axle 23, upon which the drive-wheels 24 are held to revolve.

From the overhanging or outer portion of each bracket 17 a perpendicular post 25 is downwardly projected, which posts are stayed by brace-bars 26, attached to their lower ends, and also to the under face of the side beams 10 at or near their central portion.

In connection with the frame two mold-boards 27 are employed, the said mold-boards being each provided with a shear-section 28 at the forward lower end, produced by turning upward and inward the lower edge, as best illustrated in Fig. 3. The rear ends of the mold-boards are preferably made narrower than the forward ends, and the said rear ends are given a gradual inward curve from the bottom upward, whereby the top edge essentially overhangs the bottom edge. Each mold-board upon its outer face, at or near the forward end, is provided with an attached plate 29, which plate has formed at its upper end a staple 30, and near its lower end is provided with an eye 31, and in attaching the mold-boards to the perpendicular posts 25 of the brackets 17 the said posts are made to pass through the eyes 31 and the staples 30. Both the eyes and staples are sufficiently large to admit of the vertical adjustment of the mold-boards upon the posts.

The vertical adjustment of the mold-boards is effected by attaching to the staples 30 of each board one end of a link 32, the other end of said link being adjustably connected with the forward extremity of a lever 33, one of said levers being located at each side of the frame and fulcrumed upon uprights 34, attached to the side beams 10 of the frame. The levers 33 are each provided with a rack 35, also secured to the side beams 10 of the frame, and an attached thumb-lever 36 of any approved construction capable of engaging with the rack.

At the rear end of each mold-board upon the outer face a stirrup 37 is rigidly bolted, and upon the inner end of each stirrup at the top a clutch-surface 38 is formed, and at this point an arm 39 is attached, extending upward, also provided with a clutch-surface and pivoted to the stirrup by a suitable bolt controlled by a nut. By this means the arms 39 may be adjusted in the direction of either side of the frame, and the two mold-boards are connected at their rear ends by a spiral spring 40, the ends of said spring being secured to the upper extremities of the arms 39.

The mold-boards are so hung that they are quite a distance apart at their forward ends and quite near together at their rear extremities. The rear ends of the mold-boards are elevated by means of chains 41, one chain being attached to the outer upper end of each of the stirrups 37. Each chain passes over a friction-pulley 42, journaled upon the upper end of a rack 43, one of the racks 43 being secured to the center cross-beam 11, near each end of the same. These racks preferably consist of a standard having a series of slots or openings $a$ transversely formed therein and provided with a vertical guide-strip $a'$ parallel with yet spaced from the outer side of the standard. Between the standard and the guide-strip $a'$ a lever 44 is passed, the forward end of which lever is pivoted upon a suitable upright attached to the forward cross-bar 12. It will be understood that two levers 44 are employed—one at each side of the frame—and that a rack is provided for each. The levers are held at a downward inclination by means of a spring 45, attached thereto at one end, the free end of which spring bears against the inner face of the guide-strip $a'$ of the rack, and each lever is provided with a lug 46 upon its inner face, which lug is pressed into one of the openings $a$ of the rack-standard by the action of the spring 45. The chains 41, after having been passed over the friction-pulleys 42, are each secured in any suitable or approved manner to one of the levers 44, as shown in Figs. 2 and 3.

The levers 33 and 44 extend to the rear of the machine and are within easy reach of the driver, whose seat 48 is preferably supported upon a spring-bar 49, the said bar being attached at its extremities to the rear portion of the side beams 10 of the frame.

The shafts 50 are secured to the center cross-bar 11 and forward cross-bar 12—one at each side of the center—and the said shafts are preferably made to contact with each other at their outer ends.

Upon an arch 51, connected with the shafts in front of the frame, an evener 52 is fulcrumed, and from each extremity of said evener a bar 53 is perpendicularly projected downward, provided at the lower end with a series of apertures 54, in one of which apertures the forward end of a link 55 is attached, the rear end of the link being secured to the wheel-pedestal 22, and upon the forward edge of each of the evener-bars 53 a whiffletree 56 is pivoted, whereby the animals drawing the machine are located one at each side of the shafts. The evener-bars are pivotally attached to the evener at their upper ends. The evener-bars are further stayed by means of a chain 57, secured at one end to the upper portion of the evener-bars and at the other end to the forward edge of the forward cross-bar 12.

In the operation of hilling celery the mold-boards gather the earth from the bottom of the rows over which they are carried simultaneously—one at each side of the row of plants to be cultivated—and carry the said earth upward under the leaves of the plants, packing the earth in such a position that the plants are effectually maintained in the upright position, which is very essential.

The machine is adjustable to rows from three to five feet apart and from six inches to two and a half feet in height. The spiral spring 40 admits of the adjustment of the mold-boards to any inequalities in the height of the celery; or by throwing the arms 39 outward to lengthen the spring 40 the rows may be half-hilled, if found desirable.

The use of the levers and the double swivel-joint of the mold-boards at the rear places the machine under perfect control. The operator by resting his feet in the stirrups of the mold-boards can adapt them to any crookedness of the rows or irregularities of the surface.

Having thus described my invention, I claim as new and desire to secure by Letters Patent—

1. In a machine of the character described, the combination, with a frame, of two mold-boards suspended beneath the frame at an angle to each other, each mold-board having a straight body portion and provided with an inwardly-extending share at its lower forward edge and with vertically-curved rear end, the said rear end being narrower than the forward end, substantially as described.

2. The combination, with a frame, of two vertically-adjustable mold-boards suspended beneath said frame at an angle to each other, each mold-board being provided with a stirrup at its rear, and means for independently adjusting each end of the mold-boards, substantially as shown and described.

3. The combination, with a frame, of two vertically-adjustable mold-boards suspended beneath the frame at an angle to each other, the rear ends of said mold-boards being provided with stirrups, an adjustable arm attached to each stirrup, and a spring connecting the two arms, substantially as shown and described.

4. The combination, with a frame, of two vertically-adjustable mold-boards suspended beneath the frame at an angle to each other, the rear ends of said mold-boards being provided with stirrups, an adjustable arm attached to each stirrup, a spring connecting the two arms, and means, substantially as shown and described, for independently raising the forward and rear ends of the mold-boards, as and for the purpose specified.

5. The combination, with a laterally-adjustable frame and hangers projected downward from the forward portion of the frame, of mold-boards held to slide upon said hangers at their forward ends, the rear ends of which mold-boards approach one another and are spring-connected, levers fulcrumed upon the frame, and a connection, substantially as shown and described, between the levers and the forward and rear ends of the mold-boards, substantially as specified, whereby the said mold-boards may be elevated at either end or evenly throughout their length.

MAURICE M. RANNEY.

Witnesses:
MILTON WESTBROOK,
ORLO B. RANNEY.